No. 822,124. PATENTED MAY 29, 1906.
J. P. HILL.
CULTIVATOR.
APPLICATION FILED AUG. 8, 1905.
2 SHEETS—SHEET 2.
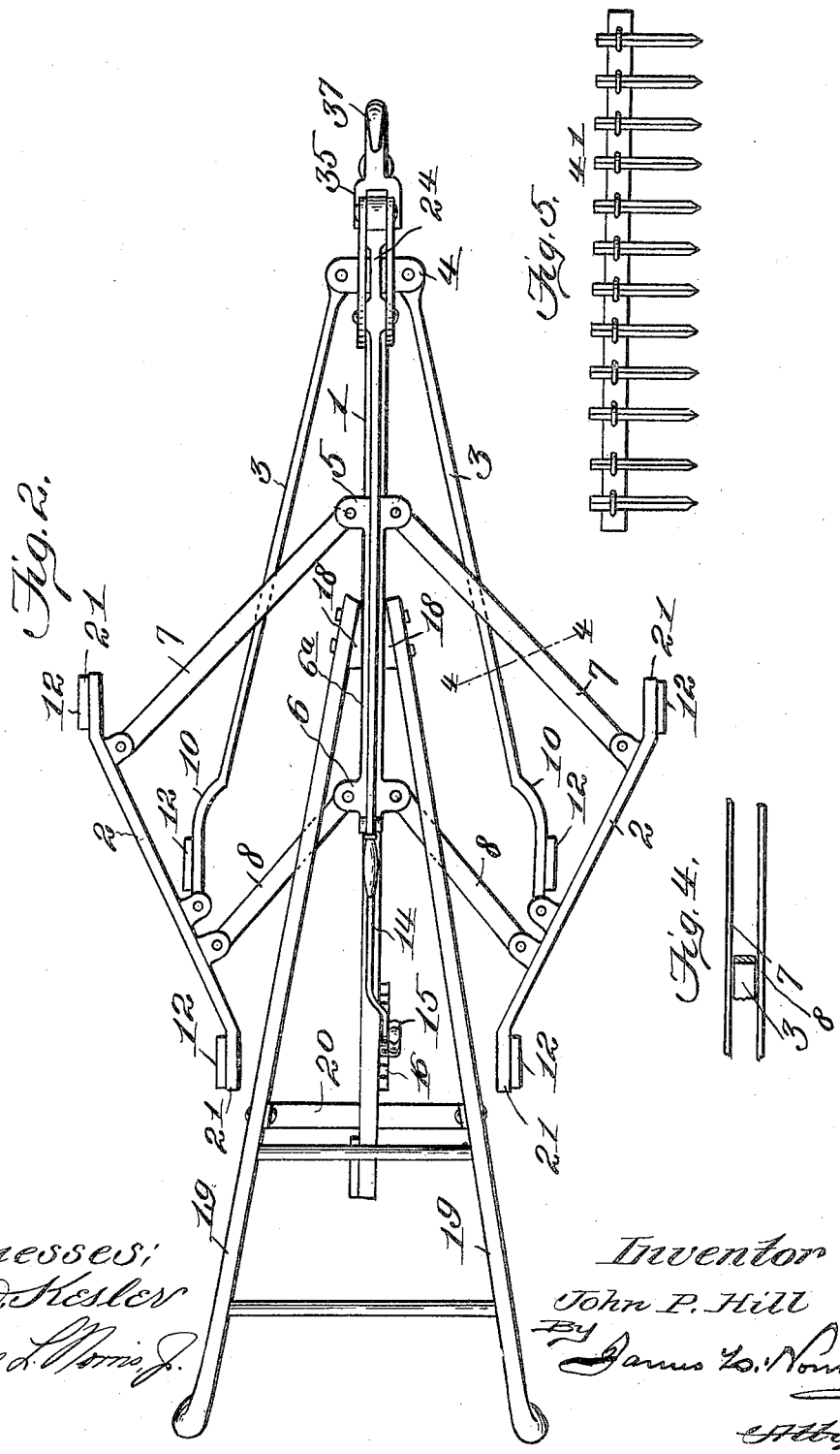
Witnesses:
Inventor
John P. Hill

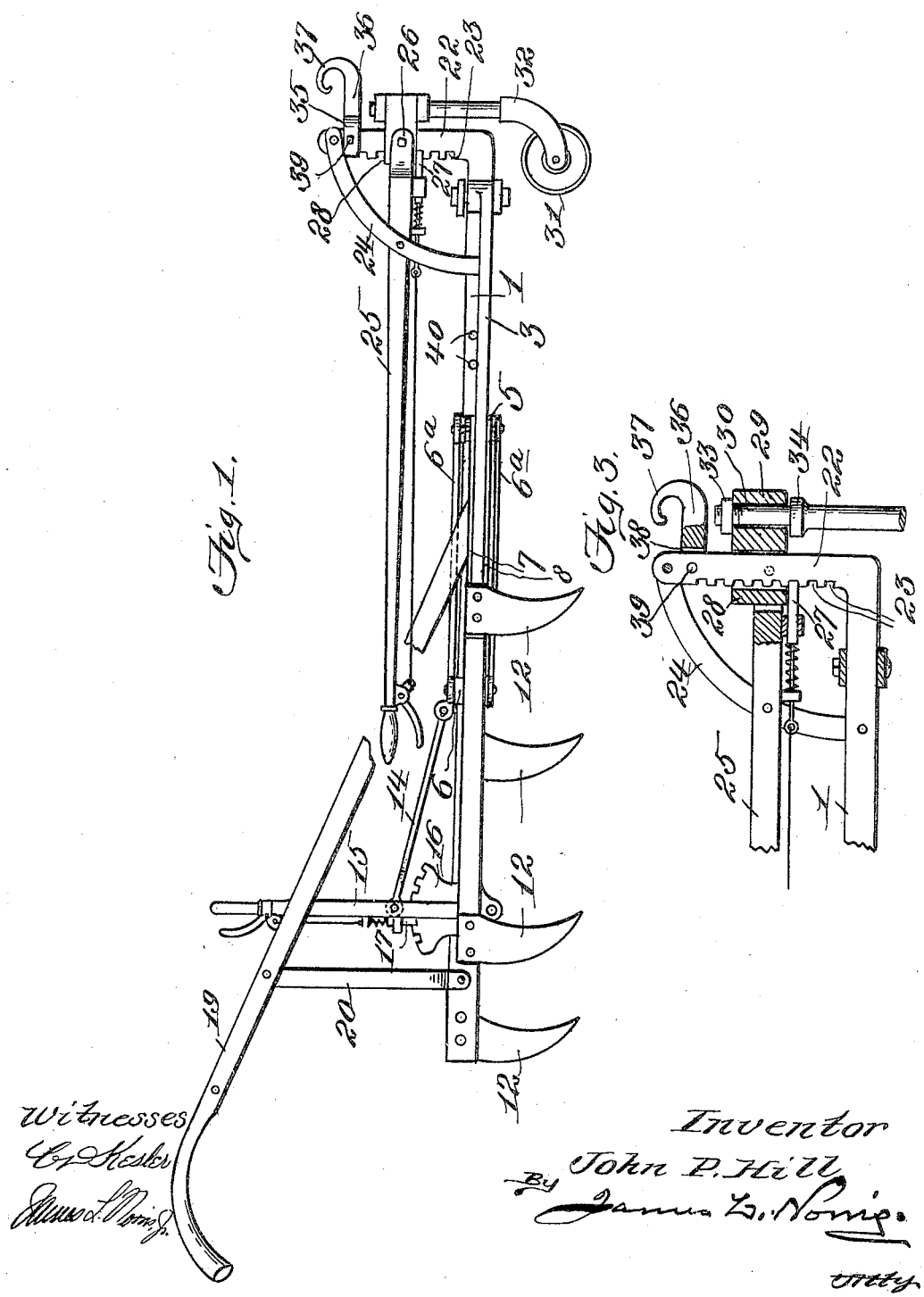

UNITED STATES PATENT OFFICE.

JOHN P. HILL, OF SEFFNER, FLORIDA.

CULTIVATOR.

No. 822,124.        Specification of Letters Patent.        Patented May 29, 1906.

Application filed August 8, 1905. Serial No. 273,255.

*To all whom it may concern:*

Be it known that I, JOHN P. HILL, a citizen of the United States, residing at Seffner, in the county of Hillsboro and State of Florida, have invented new and useful Improvements in Cultivators, of which the following is a specification.

This invention relates to improvements in cultivators of that class embodying a main beam with adjustable supplemental or fly beams and an adjustable gage-wheel.

The primary object of the invention is to provide a cultivator in which the width thereof can be readily increased or decreased at will by the operator to accommodate treatment of rows of plants separated by different widths or spaces.

A further object of the invention is to provide a cultivator in which the cultivating devices or plows are so arranged as to follow each other so that the furrow next to the plants cultivated may be filled by the plow following to avoid leaving an open furrow next to the plants and prevent drying out of soil adjacent to the latter.

A further object of the invention is to provide a simple and effective means for adjusting the gage-wheel and for applying a draft-attaching means.

A still further object is to provide a simple and effective cultivator organization of a strong and durable nature.

In the drawings, Figure 1 is a side elevation of a cultivator embodying the features of the invention. Fig. 2 is a top plan view of the same. Fig. 3 is a longitudinal vertical section through portions of the forward extremity of the cultivator. Fig. 4 is a transverse section on the line 4 4, Fig. 2. Fig. 5 is a detail view of a pulverizer attachment adapted to be substituted for a part of the cultivator.

Similar numerals of reference are employed to indicate corresponding parts in the several views.

The numeral 1 designates a main or central beam, 2 supplemental or fly beams, and 3 side beams or members movably attached at their rear ends to the intermediate portions of the inner sides of the supplemental or fly beams and at their forward extremities secured to a cross-head 4, held on the main or central beam 1. On the main or central beam 1 are front and rear slide-boxes 5 and 6, secured to each other by straps 6ª and respectively connected by means of links or adjusting-bars 7 and 8, to the supplemental or fly beams 2, the said links or adjusting-bars 7 and 8 being movably secured at their opposite extremities to the boxes and the supplemental or fly beams. These links are also formed with upper and lower members with an opening therebetween (see Fig. 4) for movable passage of the side beams 3 therethrough. This assemblage materially strengthens the links 9. The links or adjusting-bars 7 and 8 are of such length that the supplemental or fly beams 2 will be held at angles of inclination with respect to the main or central beam 1 and converged rearwardly, as clearly shown by Fig. 2. The rear end of the main or central beam 1 and the forward and rear extremities of the supplemental or fly beams 2 have cultivating devices of any suitable nature attached thereto, and it will be understood that any type of cultivating device may be employed, and the fastening means therefor will be so arranged that a substitution of one kind for another can be readily obtained.

The side portions or connecting members 3 have their rear extremities curved outwardly, as at 10, and secured thereto are cultivating devices 12, one on each, similar to the devices 10, thus forming a cultivator having seven plows or other devices 10 and 12. At times the cultivating devices 12 may be omitted and the cultivator be used with five plows carried by the main or central beam 1 and the supplemental or fly beams 2.

The boxes 5 and 6 are preferably connected by straps 6ª for unitary adjustment or moved, as heretofore explained, and to the rear box 6 is attached a link-bar 14, which runs to an adjusting-lever 15, coöperating with a toothed segment 16, held on the rear extremity of the main or central beam 1, this adjusting-lever being provided with the usual catch-dog 17. By moving the lever 15 forwardly the supplemental or fly beams 2 will be drawn inwardly toward the main beam, and a reverse operation of the adjusting-lever will result in throwing the supplemental or fly beams outwardly, and by this means different degrees of adjustment may be obtained to space the cultivating devices or plows 10 and the cultivating devices 12 when used as may be desired to accommodate a difference in width of rows of plants to be cultivated.

On the main or central beam 1, between the slide-boxes 5 and 6, rearwardly and outwardly inclined lugs or bosses 18 are mounted to receive the lower ends of handles 19 of the usual form, the latter being preferably sustained by braces 20, running from the intermediate portions thereof downwardly and intermediately of the rear extremity of the main beam. The adjusting-lever 15 will project upwardly between the handles 19, and the latter will be used as in ordinary cultivators.

It will be seen that the outwardly-curved rear extremities of the side portions or connecting members 3 dispose the cultivating devices or plows 12, secured thereto, at points intermediate of the similar devices carried at the forward and rear extremities of the supplemental or fly beams 2, and all of the cultivating devices or plows are in such relation with respect to each other that the furrows made by the forward ones will be covered by the next succeeding devices of a similar character. To properly dispose the cultivating devices or plows on the supplemental or fly beams 2, the front and rear extremities 21 thereof are formed straight and in parallel relation to the main or central beam 1 or at angles to the said supplemental beams. This structural provision permits all the cultivating devices or plows to form straight parallel furrows or to produce furrows parallel to the rows of plants treated; but at the same time the supplemental or fly beams 2 are disposed in angular position with respect to the main or central beam 1, as heretofore set forth, to obtain a compact organization of the different parts of the cultivator and effectiveness in the adjustment of said supplemental beams.

Rising from the front end of the main or central beam 1 is a post 22, having the rear edge for a portion of its vertical extent formed with teeth 23. To the upper end of the post 22 and to the main or central beam 1 in rear of the cross-head 4 a pair of spaced segmental braces 24 are secured, and therebetween is disposed an adjusting-lever 25, fulcrumed to the braces through the medium of a fulcrum-pin or other analogous device 26. The adjusting-lever 25 projects rearwardly a sufficient distance to be within easy reaching distance of the operator at the rear of the cultivator, and carried thereby is a catch-dog 27 of the usual form and operated in a manner similar to devices of this character. The catch-dog 27 is adapted to engage the teeth 23 of the post 22, and the forward end of the lever 25 is connected to rear flange extensions 28 of a sleeve or swivel connection 29, through which extends the vertical stem 30 of a gage-wheel 31, the latter being attached to the stem by a yoke or other analogous device 32, projecting downwardly under the main or central beam 1. On the upper end of the stem 30 and at a suitable distance below the upper end of the latter stop collars or shoulders 33 and 34 are secured, and between the said stop collars or shoulders the swivel connection or sleeve 29 is disposed, and by this means the gage-wheel 31 can be raised or lowered to regulate the depth of cut or penetration of the cultivating devices or plows by raising or lowering the forward extremity of the main or central beam 1 and vary the angle of draft strain accordingly.

The invention also includes in its organization a particular form of clevis device consisting of a head 35, having a forwardly-projecting neck 36, upturned and directed rearwardly to produce an attaching-hook 37 for application thereto of the usual draft appliances. The rear extremity of this clevis device is bifurcated or slotted, as at 38, to fit over or embrace the upper extremity of the post 22 below the point of attachment of the segmental braces 24 to the latter. The clevis device is held in connection with the post by a bolt 39, passed therethrough and through the said post, and when the clevis device is applied it projects over the upper extremity of the swivel connection for the gage-wheel without interfering with the latter. By the application of this clevis device as set forth and in conjunction with the gage-wheel, the draft can be readily regulated to render the cultivating devices or plows effective in forming furrows of any depth desired.

In advance of the front slide 5 the main beam 1 has a pair of openings 40 formed therein for removable attachment of an extra plow-stock and plow when desired. Fig. 5 shows a pulverizing attachment 41, which is adapted to be substituted for each of the fly-beams 2. Other attachments may also be applied to replace the fly-beams.

It will be understood that changes in the proportions, dimensions, and minor details may be resorted to without departing from the spirit of the invention.

Having thus described the invention, what is claimed is—

1. In a cultivator of the class set forth, the combination of a main beam, supplemental beams disposed on opposite sides of the main beam at the rear extremity of the latter and arranged at angles of inclination, adjusting-bars connected to the supplemental beams and movable longitudinally of the main beam, and side beams attached to intermediate portions of the supplemental beams and to the forward extremity of the main beam, the main beam and supplemental beams carrying cultivating devices or plows.

2. In a cultivating device of the class set forth, a main beam, supplemental beams on opposite sides of the main beam and arranged at angles of inclination, means for adjusting the supplemental beams inwardly and outwardly with respect to the main beam, side beams attached to the supplemental beams and the forward extremity of the main beam and provided with outwardly-curved projected rear extremities, and cultivating devices carried at the rear extremity of the main beam, the opposite extremities of the supplemental beams, and by the outwardly-projected rear extremities of the side beams.

3. In a cultivating device of the class set forth, the combination of a main or central beam, supplemental beams disposed on opposite sides of the main beam and arranged at angles of inclination with respect to the latter, and having their opposite extremities free, connecting devices between the supplemental beams and the main beam, the said connecting devices being attached to the supplemental beams inwardly from the ends thereof, a part of said connecting devices being adjustable to move the supplemental beams inwardly and outwardly with relation to the main beam, and cultivating devices carried by the main beam and supplemental beams.

4. In a cultivator of the class set forth, the combination of a main beam carrying a cultivating device at its rear extremity, supplemental beams on opposite sides of the main beam and disposed at angles of inclination with respect to said main beam, the forward and rear extremities of the supplemental beams being arranged parallel to the main beam, cultivating devices carried by the said forward and rear extremities of the supplemental beams, and means for adjusting the supplemental beams inwardly and outwardly with respect to the main beam.

5. In a cultivator of the class set forth, the combination of a main beam, supplemental beams disposed on opposite sides of the main beam and arranged at angles of inclination and converging toward the rear end of said main beam and having their opposite extremities free, adjusting-bars attached to the supplemental beams, boxes slidably mounted on the main beam and having the inner ends of the adjusting-bars attached thereto, side beams movably attached to intermediate portions of the supplemental beams and to the forward extremity of the main beam, cultivating devices carried by the several beams, and means connected to the slide-boxes for moving the same to regulate the inward and outward position of the supplemental beams with respect to the main beam.

6. In a cultivator of the class set forth, the combination of a main beam, cultivating devices supported thereby, a post rising from the forward end of the main beam and having teeth at its inner edge, an adjusting-lever fulcrumed on the post and projecting rearwardly therefrom and carrying a catch device to engage the teeth of the post, and a gage-wheel having a swivel-sleeve connected to the lever and adjustable by the latter to elevate or depress the forward extremity of the main beam.

7. In a cultivator of the class set forth, the combination of a main beam, carrying cultivating devices, a post rising from the forward extremity of said beam and having a rearwardly-projecting adjusting-lever fulcrumed thereto for raising and lowering the front extremity of the beam, a gage-wheel adjustably arranged in connection with said post, and a clevis device fitted over the upper extremity of the post and having a front hooked terminal for application thereto of draft appliances, the clevis device being disposed over the upper portion of the gage-wheel and vertically adjustable with the post.

8. In a cultivator of the class set forth, the combination of a main beam, supplemental beams disposed on opposite sides of the main beam and arranged at angles of inclination, adjusting-bars comprising upper and lower members connected to the supplemental beams and movable longitudinally of the main beam, and side beams attached to intermediate portions of the supplemental beams and to the forward extremity of the main beam, said side beams projecting through the upper and lower members of the adjusting-bars and the main and supplemental beams carrying supplemental devices or plows.

9. In a cultivating device of the class set forth, a main beam, supplemental beams on opposite sides of the main beam and arranged at angles of inclination, means for adjusting the supplemental beams inwardly and outwardly with respect to the main beam, side beams attached to the supplemental beams and the forward extremity of the main beam, boxes slidable on the main beam and connected by longitudinally-extending straps, the means for adjusting the supplemental beams being attached to said boxes, and cultivating devices carried by the main and supplemental beams.

10. In a cultivating device of the class set forth, a main beam, supplemental beams on opposite sides of the main beam and arranged at angles of inclination, means for adjusting the supplemental beams inwardly and outwardly, side beams attached to the supplemental beams between the points of attachment thereto of the said means and also movably secured to the forward extremity of the main beam and provided with outwardly-curved projected rear extremities, and cultivating devices carried at the rear extremity of the main beam, the opposite extremities of the supplemental beams and the outwardly-projected rear extremities of the side beams.

In testimony whereof I have hereunto set my hand in presence of two subscribing witnesses.

JOHN P. HILL.

Witnesses:
  THOS. J. TEDDER,
  JESSE TAYLOR.